United States Patent [19]

Pagniez et al.

[11] Patent Number: 4,824,648
[45] Date of Patent: Apr. 25, 1989

[54] PREPARATION OF LINEAR POLYCHLOROPHOSPHAZENES

[75] Inventors: Guy Pagniez, Poey De Lescar; Nadine Passimourt, Pau; Philippe Potin, Billere, all of France

[73] Assignee: Atochem, Puteaux, France

[21] Appl. No.: 166,368

[22] Filed: Mar. 10, 1988

[30] Foreign Application Priority Data

Mar. 10, 1987 [FR] France ................ 87 03250

[51] Int. Cl.$^4$ .............................. C01B 25/10
[52] U.S. Cl. ................................ 423/300
[58] Field of Search ........................ 423/300

[56] References Cited

U.S. PATENT DOCUMENTS 2,925,320  2/1960  Kahler .................... 423/300
2,975,028  3/1961  Barth-Wehrenalp et al. .... 423/300
4,377,558  3/1983  De Jaeger et al. .......... 423/300
4,544,536  10/1985 De Jaeger et al. .......... 423/300
4,693,876  9/1987  De Jaeger et al. .......... 423/300

Primary Examiner—John Doll
Assistant Examiner—Wayne A. Langel
Attorney, Agent, or Firm—Burns, Doane, Swecker & Mathis

[57] ABSTRACT

Linear polychlorophosphazenes are more rapidly produced by polycondensing N-(dichlorophosphoryl)trichlorophosphazene [$P_2NOCl_5$] in the presence of a catalytically effective amount of the bis(dichlorophosphoryl)imide of the formula:

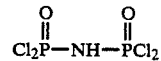

4 Claims, No Drawings

PREPARATION OF LINEAR POLYCHLOROPHOSPHAZENES

CROSS-REFERENCE TO COMPANION APPLICATIONS

Copending application, Ser. No. 166,369, filed concurrently herewith and assigned to the assignee hereof. Cf. copending applications, Ser. No. 119,195, filed Nov. 12, 1987, Ser. No. 166,367, and Ser. No. 166,270, the latter two also filed concurrently herewith and assigned to the assignee hereof.

BACKGROUND OF THE INVENTION

1. Field of the Invention

The present invention relates to the preparation of polychlorophosphazene by polycondensation of N-(dichlorophosphoryl)trichlorophosphazene.

2. Description of the Prior Art

It is known to this art (published European patent application No. 0,026,685) to prepare linear polychlorophosphazenes by the polycondenstion of N-(dichlorophosphoryl)trichlorophosphazene according to the following reaction scheme:

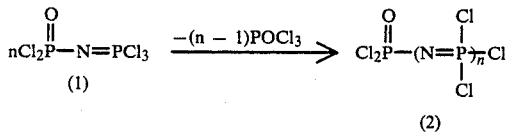

Compared to the process described in U.S. Pat. No. 3,370,020 (which employs a hexachlorocyclotriphosphazene starting material), the process described in the noted '685 European application enables production of non-crosslinked polymers of high molecular weight from readily available monomers, while controlling the molecular weights at the levels desired.

The process described in the '685 European application is generally carried out at a temperature of from 240° to 350° C. for 8 to several tens of hours, depending on the level of molecular weight desired.

SUMMARY OF THE INVENTION

A major object of the present invention is the provision of an improved process for the preparation of linear polychlorophosphazenes by the polycondensation of N-(dichlorophosphoryl)trichlorophosphazene, whereby the polycondenation reaction is appreciably accelerated vis-a-vis the techniques to date characterizing the state of this art.

Briefly, the present invention features the polycondensation of N-(dichlorophosphoryl)trichlorophosphazene, wherein the polycondensation is carried out, in whole or in part, in the presence of a catalytically effective amount of the bis(dichlorophosphoryl)imide having the formula:

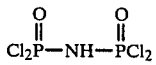

DETAILED DESCRIPTION OF THE PREFERRED EMBODIMENTS OF THE INVENTION

More particularly according to the present invention, the bis(dichlorophosphoryl)imide of Formula (3) is a known compound and is described, for example, in R. Riesel, H. H. Patzmann, H. P. Bartich in *Z. Anorg. Allg. Chem.*, t.404, page 219 (1974). It may be produced in a first stage by the hydrolysis of the N-(dichlorophosphoryl)trichlorophosphazene of Formula (1). The efficiency of this compound as a polycondensation catalyst is quite surprising, in that such polycondensation reaction must strictly be conducted in the absence of humidity, as the latter would effect a crosslinking of the polychlorophosphazene.

The bis(dichlorophosphoryl)imide of Formula (3) well catalyzes the polycondensation of the monomer of Formula (1) into essentially linear polychlorophosphazenes, without the partial or total formation of an isoluble and characteristically unusable crosslinked gel. Such gel is produced when the monomer of Formula (1) is is contact with humidity, before or after the polycondensation.

The amount of bis(dichlorophosphoryl)imide of Formula (3) that is advantageously introduced into the polycondensation reactor at the onset or during the polycondensation, or progressively, is generally higher than 0.05 molar %, relative to the monomer being subjected to polycondensation. The maximum amount of the imide depends on various factors, in particular the molecular weight desired, the specific reactivity of the monomer (1), the temperature selected for the polycondensation reaction. In general, it is preferable not to exceed 1.5 molar % (relative to the monomer of Formula (1); it will be appreciated that the selection of precise amounts of the imide from the broad range is well within the skill in the art, to obtain the desired molecular weights, but without a crosslinking of the polymer.

The process according to the invention may be carried out in solution, both relative to the introduction of the bis(dichlorophosphoryl)imide and the polycondensation reaction itself, for example in an mono- or polycyclic, chlorinated aromatic hydrocarbon, such as trichlorobenzene or trichlorodiphenyl.

As regards specific operating conditions, the general and preferred parameters are as set forth in EP No. 0,026,685, hereby expressly incorporated by reference. In particular, the conditions described in the '685 application relative to the duration of the reaction, temperature, pressure, the possibility of conducting the reaction successively at different temperatures and/or pressures are here applicable. Likewise as regards the control of the polycondensation reaction and the purification of the polychlorophosphazene produced.

It is known that the course of the polycondensation reaction is accompanied by release of POCl$_3$. Consequently, the rate of release of POCl$_3$ is proportional to the rate of growth of the macromolecular chains. The advantage of the process according to the invetnion is clearly demonstrated by measuring the time required to collect 80% by weight of the POCl$_3$ theoretical ($t_{80}$)—100% corresponding to the release of all of the POCl$_3$ and the production of a polymer of Formula (2) having the desired molecular weight—in the presence or absence of the bis(dichlorophosphoryl)imide.

In order to further illustrate the present invention and the advantages thereof, the following specific examples are given, it being understood that same are intended only as illustrative and in nowise limitative.

EXAMPLES 1 TO 3

(1) Synthesis of bis(dichlorophosphoryl)imide:

This synthesis was carried out by the action of formic acid on N-(dichlorophosphoryl)trichlorophosphazene by following the procedure described by Riesel et al, supra.

The bis(dichlorophosphoryl)imide was then diluted with trichlorodiphenyl such as to provide a solution (S) containing 4.994 g (0.0199 mole)/100 g solution. (2) Polycondensation:

Into an agitated reactor, equipped with a $POCl_3$ recovery and nitrogen pressurization system, the following reagents were introduced: a g of N-(dichlorophosphoryl)trichlorophosphazene ($P_2NOCl_5$), b g of trichlorodiphenyl and c g of the solution (S) described in paragraph (1) above, which provided a molar ratio catalyst/monomer of d. The assembly was heated to g°C. The amount of $POCl_3$ was measured as a function of time and the duration in hours required to collect the $POCl_3$ theoretical ($t_{80}$).

The experiment was halted after e times $t_{80}$.

After cooling, the solution of polychlorophosphazene formed was diluted by the addition of 500 cm³ benzene.

10% of this new solution was introduced into a reactor containing 1.18 moles of sodium phenate and 150 g diglyme (diethylene glycol dimethyl ether). Following the distillation of the benzene, the mixture was heated to 120° C. for 48 hr.

350 cm³ of benzene were added and the solution was neutralized with concentrated HCl. The polymer and the sodium chloride were dried and washed with benzene. The cake obtained was suspended in ten times its volume of ethanol, then dried. The operation was repeated with an (80/20) mixture of methanol and water and then with water at 80° C.

The polymer was dissolved hot (. . . °C.) in 40 times its volume of tetrahydrofuran (THF), then filtered. The solution was concentrated until a syrup was obtained and then poured slowly into 1 dm³ water under strong agitation.

The precipitate was drained and dried under a reduced pressure of . . . mm of mercury at 80° C.

The polydiphenoxyphosphazene produced had an intrinsic viscosity of f ml/g (THF at 30° C.).

In the following tables, which correspond to the experiments performed with two lots of $P_2NOCl_5$, the different values of a, b, c, d, $t_{80}$, e, f and g are reported for the three examples (1, 2 and 3) according to the invention and for three comparative examples ($C_1$, $C_2$, $C_3$) carried out either in the absence of bis(dichlorophosphoryl)imide or using a much higher molar ratio of catalyst/monomer.

First monomer lot:

| Examples | a | b | c | d % | $t_{80}$ | e | f | g |
|---|---|---|---|---|---|---|---|---|
| 1 | 124 | 122.8 | 2.638 | 0.114 | 1.93 | 20 | 32 | 260 |
| 2 | 144 | 142.6 | 10.653 | 0.397 | 1.60 | 20 | 32 | 160 |
| $C_1$ | 133 | 131.7 | — | — | 3.22 | 20 | 42 | 260 |

Second monomer lot:

| Examples | a | b | c | d % | $t_{80}$ | e | f | g |
|---|---|---|---|---|---|---|---|---|
| 3 | 160 | 158.45 | 32.39 | 1.1 | 0.9 | 20 | 31.5 | 270 |
| $C_2$ | 138 | 136.66 | — | — | 2.08 | 20 | 35.5 | 270 |
| $C_3$ | 137 | 135.67 | 45.18 | 1.77 | 0.6 | 16.86 | GEL | 270 |

From the foregoing and by comparing the Examples 1 to 3 with the Examples $C_1$ to $C_3$, it will be seen that the use of bis(dichlorophosphoryl)imide makes it possible to reduce the value of $t_{80}$, $t_{80}$ being a value representative of reactivity, in all stages of the polycondensation. It will also be seen that the bis(dichlorophosphoryl)imide strongly catalyzes the polycondensation, to the extent that an excessive amount of bis(dichlorophosphoryl)imide gives rise to the formation of an insoluble gel ($C_3$).

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a linear polychlorophosphazene, comprising polycondensing N-(dichlorophosphoryl)trichlorophosphazene [$P_2NOCl_5$], at least a part of the polycondensation reaction being carried out in the presence of a catalytically effective amount of the bis(dichlorophosphoryl)imide of the formula:

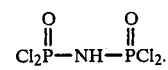

$$\underset{Cl_2P-NH-PCl_2}{\overset{O\quad\quad O}{\|\quad\quad\|}}.$$

2. The process as defined by claim 1, carried out in the presence of more than 0.05 mole % of the bis(dichlorophosphoryl)imide, relative to the monomer.

3. The process as defined by claim 2, carried out in the presence of no greater than 1.5 mole % of the bis(dichlorophosphoryl)imide, relative to the monomer.

4. The process as defined by claim 1, carried out in an aromatic solvent medium.

* * * * *